US009808700B1

(12) United States Patent
Potter

(10) Patent No.: US 9,808,700 B1
(45) Date of Patent: Nov. 7, 2017

(54) HEAD POSITION GOLF SWING TRAINING DEVICE

(71) Applicant: Kerry Potter, Scottsdale, AZ (US)

(72) Inventor: Kerry Potter, Scottsdale, AZ (US)

( * ) Notice: Subject to any disclaimer, the term of this patent is extended or adjusted under 35 U.S.C. 154(b) by 0 days.

(21) Appl. No.: 15/285,620

(22) Filed: Oct. 5, 2016

(51) Int. Cl.
*A63B 69/36* (2006.01)
*G09B 19/00* (2006.01)

(52) U.S. Cl.
CPC ...... *A63B 69/3608* (2013.01); *G09B 19/0038* (2013.01); *A63B 2210/58* (2013.01); *A63B 2225/093* (2013.01)

(58) Field of Classification Search
CPC ............ A63B 69/3608; A63B 2210/58; G09B 19/0038
See application file for complete search history.

(56) References Cited

U.S. PATENT DOCUMENTS

| | | | | |
|---|---|---|---|---|
| 6,343,998 B1* | 2/2002 | Tarulli | ............... | A63B 69/0057 473/273 |
| 6,843,730 B1* | 1/2005 | Bellagamba | ....... | A63B 69/0057 473/207 |
| 7,204,766 B1* | 4/2007 | Rose | .................. | A63B 69/0059 473/266 |
| 8,308,580 B2* | 11/2012 | Jasinski | ............. | A63B 69/0057 473/257 |
| 2015/0265899 A1* | 9/2015 | Bell | .................... | A63B 69/3623 473/209 |

* cited by examiner

*Primary Examiner* — Michael Dennis
(74) *Attorney, Agent, or Firm* — Parsons & Goltry; Robert A. Parsons; Michael W. Goltry

(57) ABSTRACT

A golf swing training device for controlling head movements of a golfer during a swing includes a vertical support assembly, a horizontal arm coupled to the vertical support assembly, and a head engaging assembly carried by the horizontal arm. The head engaging assembly includes a generally U-shaped collar divided into two half portions hingedly coupled together and movable between an open position and a closed position. At least one of the two half portions has a coupling removably receiving the horizontal arm.

16 Claims, 4 Drawing Sheets

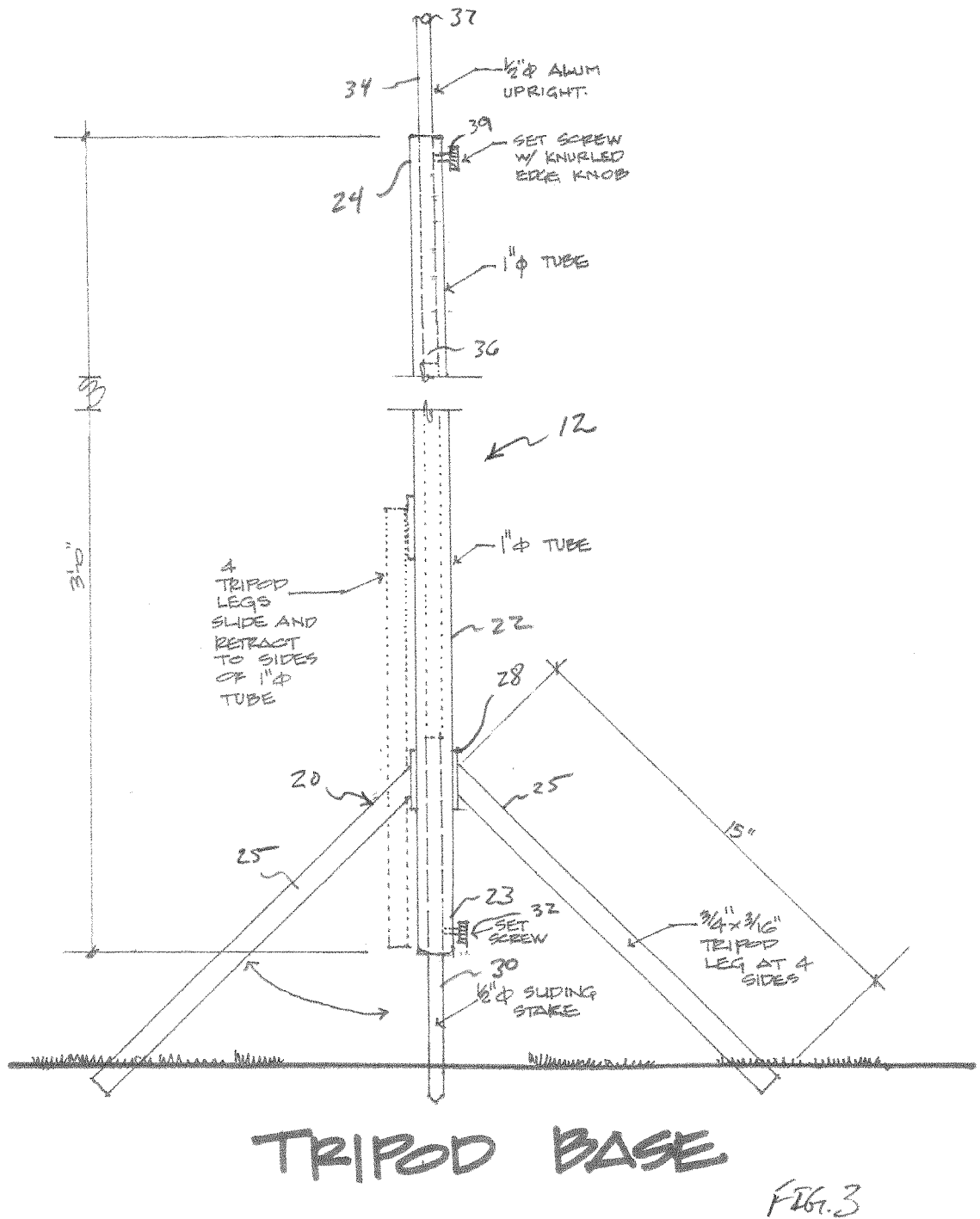

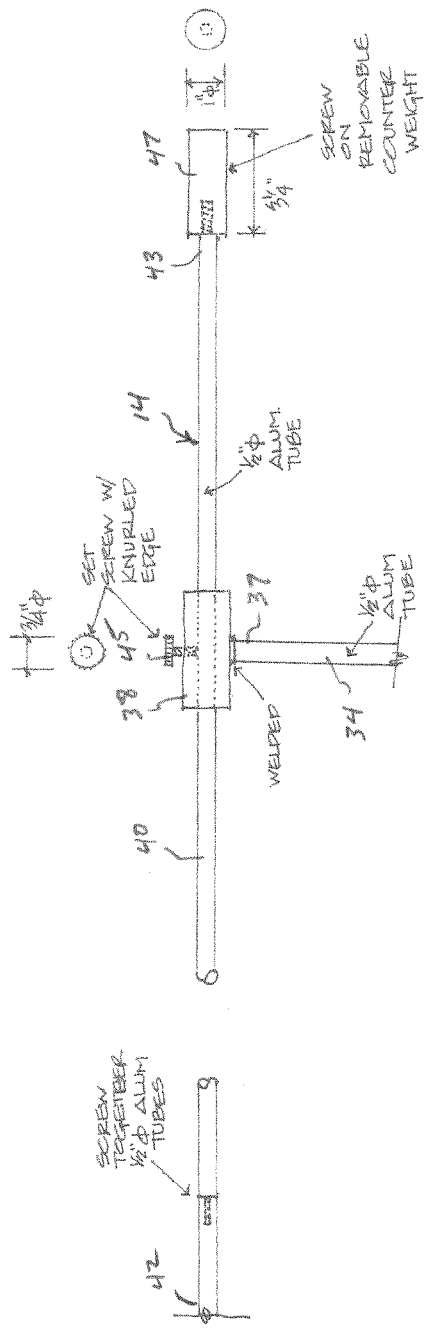

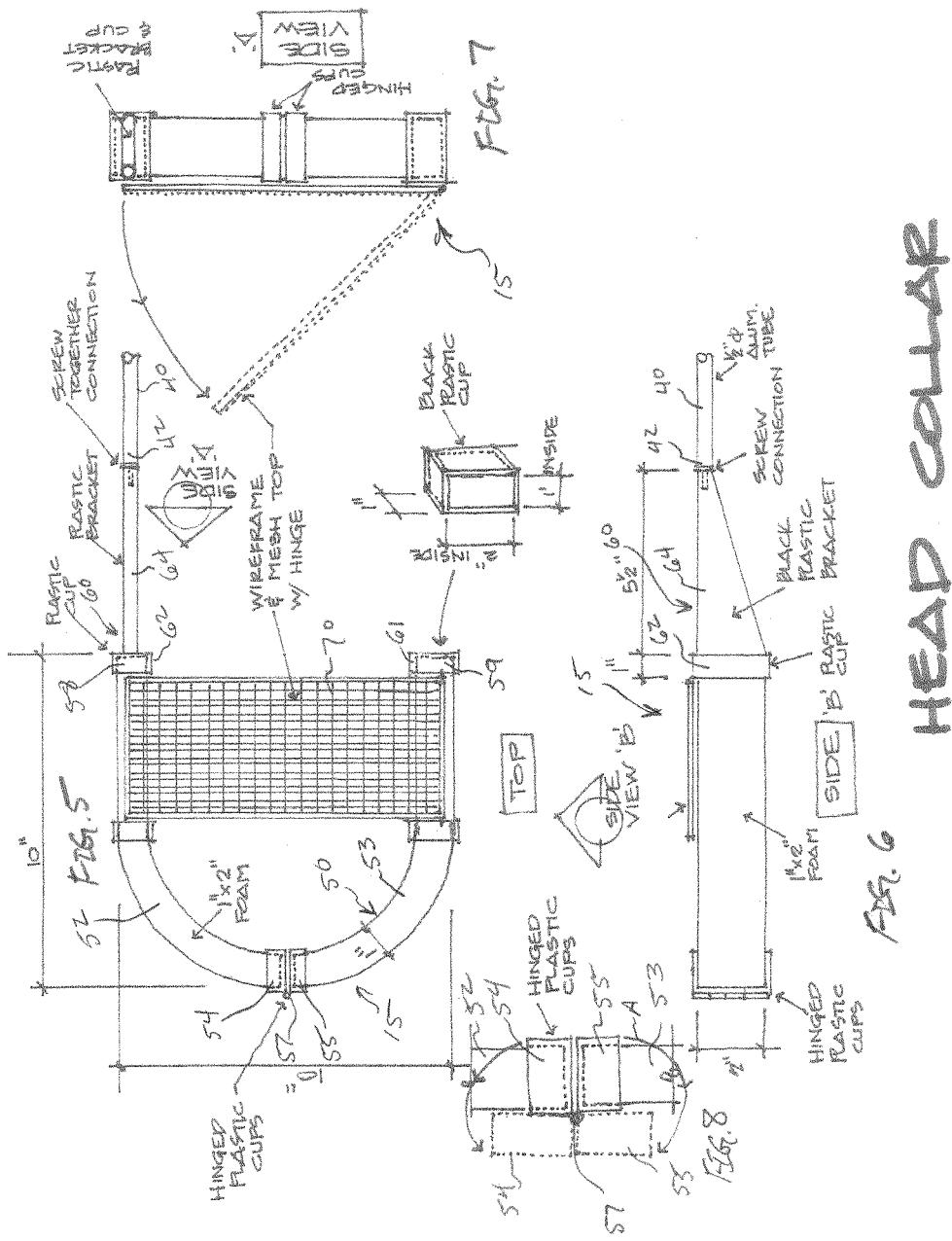

HEAD POSITION GOLF SWING TRAINING DEVICE

FIELD OF THE INVENTION

This invention relates to golf swing training devices.

More particularly, the present invention relates to golf swing training devices for positioning the golfers head during the swing.

BACKGROUND OF THE INVENTION

In golf, positioning of the head during a swing can be of great importance to successfully contacting the golf ball. To this end, many and diverse devices have been developed in an attempt to stabilize, position or otherwise constrain a golfer's head during the swing. By stabilizing a golfer's head during a swing, extraneous movement of the shoulders is reduced, keeping the arms, and thus the club, "on plane". The many devices developed, prevent or indicate lateral movement of the head, and also prevent or indicate movement of the head vertically. The theory is that by keeping the golfer's head motionless, the shoulders will be more likely to follow the correct path by turning rather than swaying or other undesirable movement. While many devices are successful in their intent, stabilization of the golfer's head can be carried to a point at which it becomes detrimental to the swing. After the proper shoulder turn and the club has come through the ball, it is often desirable for the motion of the golfer's body to progress forwardly. This "step through" motion can be slight or accentuated depending on the swing. In either case, head positioning and constraining devices can interfere with this follow through of a golf swing.

It would be highly advantageous, therefore, to remedy the foregoing and other deficiencies inherent in the prior art.

An object of the present invention is to provide a golf swing training device which positions and restrains the golfer's head.

Another object of the present invention is to provide a golf swing training device which will release the golfer's head for the follow through motion of a proper golf swing.

Yet another object of the present invention is to provide a golf swing training device which is light weight and easily transported.

SUMMARY OF THE INVENTION

Briefly, to achieve the desired objects and advantages of the instant invention, provided is a golf swing training device. The training device includes vertical support assembly, a horizontal arm coupled to the vertical support assembly, and a head engaging assembly carried by the horizontal arm. The head engaging assembly includes a generally U-shaped collar divided into two half portions hingedly coupled together and movable between an open position and a closed position. At least one of the two half portions has a coupling removably receiving the horizontal arm.

In a more specific aspect, the golf swing training device includes the head engaging assembly having a cover extending across the top of the half portions. The cover is hingedly coupled at one side to one of the half portions. The vertical support assembly is adjustable to provide height adjustment for the horizontal arm, and coincidentally the head engaging assembly. The horizontal arm is adjustable relative the vertical support assembly to provide adjustability for the positioning of the head engaging assembly relative the vertical support assembly.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 2 is a top view of the golf swing training device of FIG. 1;

FIG. 3 is a side view of a tripod base of the golf swing training device of FIG. 1;

FIG. 4 is a side view of a horizontal arm of the golf swing training device of FIG. 1;

FIG. 5 is a top view of the head engaging assembly of the golf swing training device of FIG. 1;

FIG. 6 is a side view of the head engaging assembly of FIG. 5;

FIG. 7 is an end view of the head engaging assembly of FIG. 5 and

FIG. 8 is an enlarged view of the hinge assembly of the head engaging assembly of FIG. 5.

DETAILED DESCRIPTION OF A PREFERRED EMBODIMENT

Figure 1:
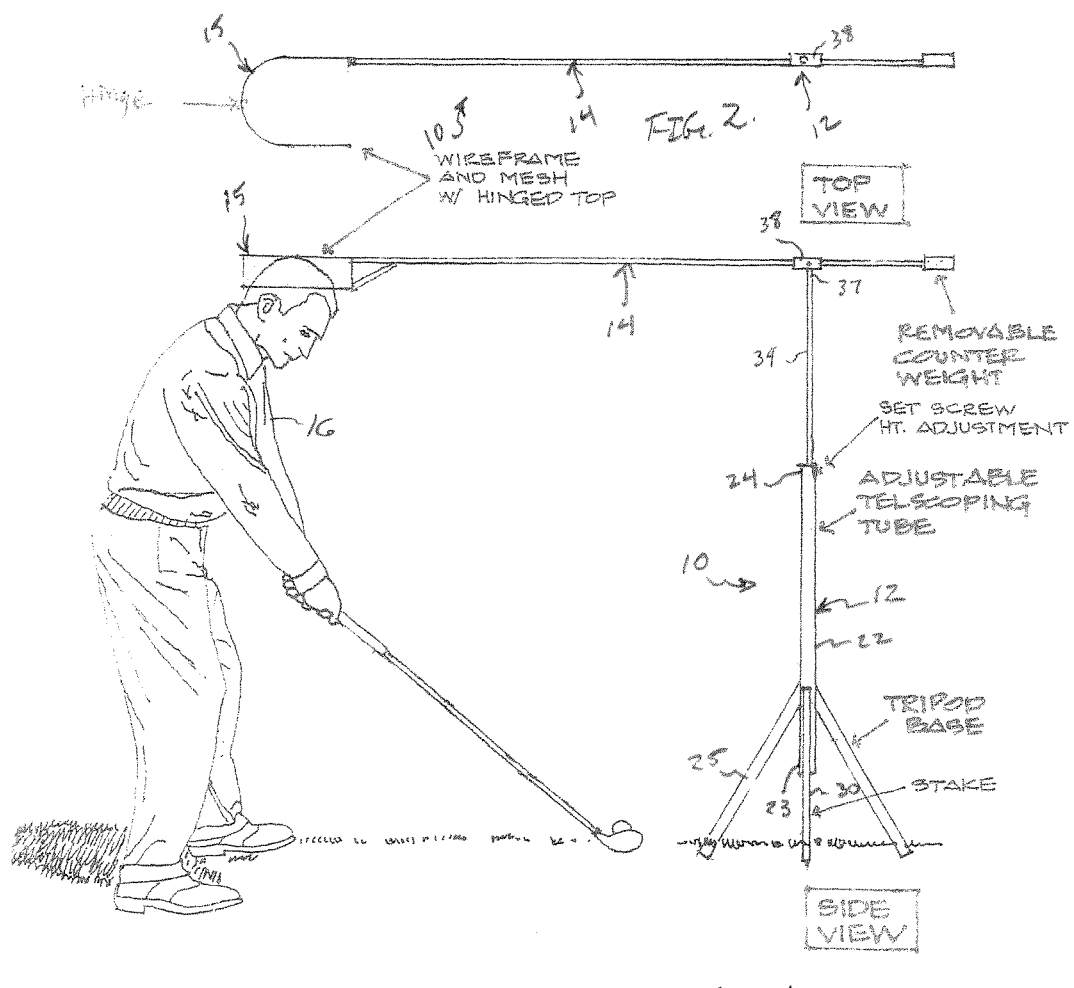
FIG. 1 is a side view of a golf swing training device in use by a golfer, according to the present invention.

Turning now to the drawings in which like reference characters indicate corresponding elements throughout the several views, attention is directed to FIGS. 1 and 2 which illustrate a golf swing training device generally designated 10. Training device 10 includes a vertical support assembly 12, a horizontal arm 14 coupled to support assembly 12, and a head engaging assembly 15 carried by horizontal arm 14. Vertical support assembly 12 is positioned in front of a golfer 16 such that horizontal arm 14 positions head engaging assembly 15 over the golfer's head. Vertical support assembly 12 is of sufficient height that head engaging assembly 15 is at the appropriate height relative the golfer's swing position. Horizontal arm 14 is of sufficient length that head engaging assembly 15 is held at a sufficient distance from vertical support assembly 12 that a golfer 16 can complete a swing without interference therefrom.

With additional reference to FIG. 3, vertical support assembly 12 includes a tripod base 20 having an upright tubular member 22 with a lower end 23 and an upper end 24. Three or more legs 25 are hingedly coupled to a slide member 28 and movable between an extended position (forming a tripod) and a retracted position substantially parallel to upright tubular member 22. Slide member 28 moves reciprocally between a lowered position toward lower end 23 and a raised position toward upper end 24. In the lowered position, legs 25 are moved to the extended position to form a supporting tripod. In the raised position, legs 25 are moved to the retracted position as illustrated by broken lines. It will be understood that while three legs 25 are preferred, four or more may be employed.

An elongated stake element 30 is reciprocally carried within upright tubular member 22 at lower end 23 and adjustably extendable therefrom. Elongated stake element 30 is locked in position by a set screw 32 carried by upright tubular member 22 at lower end 23. Elongated stake element 30 can be extended from lower end 23 to provide an anchor for tripod base 20, providing additional stability in high winds and the like. Stake element 30 is driven into the ground, preventing tipping of vertical support assembly 12.

Still referring to FIG. 3, vertical support assembly 12 further includes a telescoping upright 34 reciprocally carried within upright tubular member 22 at upper end 24 and adjustably extendable therefrom. Telescoping upright 34 includes an end 36 received in upper end 24 and an end 37 terminating in a bracket 38 (FIG. 4). Bracket 38, in this embodiment is a tubular member receiving horizontal arm 14 therethrough. Telescoping upright 34 is locked in position by a locking mechanism such as a set screw 39. It will be understood that substantially any locking mechanism can be employed for this. Telescoping upright 34 can be extended from upper end 24 of upright tubular member 22 to provide selective adjustability for the height of horizontal arm 14.

With continued reference to FIGS. 1 and 2, and additional reference to FIG. 4, horizontal arm 14 includes an elongated rod 40 having a collar end 42 and a weight end 43. Elongated rod 40 is received through bracket 38, and fastened in position by a locking mechanism such as a set screw 45. Head engaging assembly 15 is coupled to collar end 42 and a counter weight 47 is coupled to weight end 43. Counter weight 47 is removable to permit removal of elongated rod 40 from bracket 38 for disassembly. The position of head engaging assembly 15 is adjustable by extending elongated rod from bracket 38 a greater or lesser distance.

Referring now to FIGS. 5, 6, and 7, head engaging assembly 15 is illustrated. Head engaging assembly 15 includes a U-shaped collar 50 extending from collar end 42 of elongated rod 40 and sized to pass around the back of the head of a golfer. U-shaped collar 50 includes two half portions 52 and 53 hingedly joined at ends 54 and 55 by a hinge mechanism 57, and having free ends 58 and 59, respectively. In operation, hinge 57 is positioned adjacent the back of the golfer's head, while free ends 58 and 59 extend forwardly passed the front of the golfer's head. Free end 58 terminates in a coupling 60 for receipt and engagement of collar end 42 of elongated rod 40. In this preferred embodiment, coupling 60 includes a coupling member 62 for receipt of a bracket 64 which receives collar end 42. Referring briefly to FIG. 8, in this embodiment, half portion 53 is free to pivot outwardly, away from half portion 52 at hinge mechanism 57 in the direction of arrowed line A, from a closed position to an open position. Thus, after the golf swing, as the golfer shifts forwardly, his head contacts half portion 53 in the closed position which is pivoted outwardly to the open position, out of the way to allow the weight shift. To accommodate both left and right handed golfers, collar 50 can be inverted, or free end 59 can also terminated in a coupling member 61 for receipt and engagement of collar end 42 of elongated rod 40 either directly or by employing bracket 64.

Still referring to FIGS. 5, 6, and 7, while lateral motion of a golfers head is controlled by collar 50, upward movement is controlled by a cover 70 extending across half portions 52 and 53. Cover 70 is preferably a mesh material to reduce weight, and includes a hinged side 72 hingedly coupled to half portion 53 and a free side 73 overlying half portion 52. After a swing, as a golfer's weight is shifted forwardly, half portion 53 moves to the open position, and cover 70 is allowed to pivot upwardly, allowing a forward and upward movement of the golfer's head at the end of the swing follow through.

It should be understood, that while the term "control" is used in connection with relationship between collar 50 and the golfer's head, this does not necessarily mean preventing any movement. Although this is possible, in this preferred embodiment is simply means a golfer will feel any movement through contact, and will have indication of improper movement.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A golf swing training device comprising: a vertical support assembly; a horizontal arm coupled to the vertical support assembly; a head engaging assembly carried by the horizontal arm, the head engaging assembly comprising: a generally U-shaped collar divided into two portions hingedly coupled together and movable between an open position and a closed position; and at least one of the two portions having a coupling removably receiving the horizontal arm; wherein the two portions are hingedly joined at first ends by a hinge mechanism, and have free ends, one of which is attached to the horizontal arm.

2. A golf swing training device as claimed in claim 1 wherein the head engaging assembly further includes a cover extending across the top of the portions.

3. A golf swing training device as claimed in claim 2 wherein the cover is hingedly coupled at one side to one of the portions.

4. A golf swing training device as claimed in claim 1 wherein the vertical support assembly is adjustable to provide height adjustment for the horizontal arm, and coincidentally the head engaging assembly.

5. A golf swing training device as claimed in claim 1 wherein the horizontal arm is adjustable relative vertical support assembly to provide adjustability for the positioning of the head engaging assembly relative the vertical support assembly.

6. A golf swing training device as claimed in claim 1 wherein the vertical support assembly comprises:
   a base having an upright tubular member with a lower end and an upper end, at least three legs extend from the lower end;
   a telescoping upright reciprocally carried within the upright tubular member at the upper end, and adjustably extendable therefrom, the telescoping upright terminating in a bracket for receiving the horizontal arm.

7. A golf swing training device as claimed in claim 6 wherein the at least three legs are hingedly coupled to the upright tubular member and movable between an extended position and a retracted position.

8. A golf swing training device as claimed in claim 7 wherein the at least three legs are hingedly coupled to the upright tubular member by a slide member reciprocally movable between a lowered position toward the lower end and a raised position toward the upper end.

9. A golf swing training device as claimed in claim 6 wherein an elongated stake element is reciprocally carried within the upright tubular member at the lower end and adjustably extendable therefrom.

10. A golf swing training device comprising: a vertical support assembly; a horizontal arm coupled to the vertical support assembly; a head engaging assembly carried by the horizontal arm, the head engaging assembly comprising: a generally U-shaped collar divided into two portions hingedly coupled together and movable between an open position and a closed position; at least one of the two portions having a coupling removably receiving the horizontal arm; and a cover extending across the top of the portions, the cover hingedly coupled at one side to one of the portions; wherein the two portions are hingedly joined at first ends by a hinge mechanism, and have free ends, one of which is attached to the horizontal arm.

11. A golf swing training device as claimed in claim 10 wherein the vertical support assembly is adjustable to provide height adjustment for the horizontal arm, and coincidentally the head engaging assembly.

12. A golf swing training device as claimed in claim 10 wherein the horizontal arm is adjustable relative vertical support assembly to provide adjustability for the positioning of the head engaging assembly relative the vertical support assembly.

13. A golf swing training device as claimed in claim 10 wherein the vertical support assembly comprises:

a base having an upright tubular member with a lower end and an upper end, at least three legs extend from the lower end;

a telescoping upright reciprocally carried within the upright tubular member at the upper end, and adjustably extendable therefrom, the telescoping upright terminating in a bracket for receiving the horizontal arm.

14. A golf swing training device as claimed in claim 13 wherein the at least three legs are hingedly coupled to the upright tubular member and movable between an extended position and a retracted position.

15. A golf swing training device as claimed in claim 14 wherein the at least three legs are hingedly coupled to the upright tubular member by a slide member reciprocally movable between a lowered position toward the lower end and a raised position toward the upper end.

16. A golf swing training device as claimed in claim 13 wherein an elongated stake element is reciprocally carried within the upright tubular member at the lower end and adjustably extendable therefrom.

\* \* \* \* \*